(12) United States Patent
Yetukuri et al.

(10) Patent No.: US 10,640,010 B2
(45) Date of Patent: May 5, 2020

(54) ADJUSTABLE SEAT ASSEMBLY

(71) Applicant: Lear Corporation, Southfield, MI (US)

(72) Inventors: Arjun Yetukuri, Rochester Hills, MI (US); Michelle A. Pereny, Farmington Hills, MI (US); Marie-Eve Cote, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 242 days.

(21) Appl. No.: 15/724,025

(22) Filed: Oct. 3, 2017

(65) Prior Publication Data

US 2018/0186251 A1     Jul. 5, 2018

Related U.S. Application Data

(60) Provisional application No. 62/440,076, filed on Dec. 29, 2016.

(51) Int. Cl.
| | |
|---|---|
| *B60N 2/02* | (2006.01) |
| *B60N 2/00* | (2006.01) |
| *B60N 2/66* | (2006.01) |
| *B60N 2/90* | (2018.01) |
| *B60N 2/56* | (2006.01) |

(52) U.S. Cl.
CPC ........... *B60N 2/0248* (2013.01); *B60N 2/002* (2013.01); *B60N 2/0244* (2013.01); *B60N 2/0296* (2013.01); *B60N 2/665* (2015.04); *B60N 2/914* (2018.02); *B60N 2/976* (2018.02); *B60N 2/56* (2013.01); *B60N 2002/0268* (2013.01)

(58) Field of Classification Search
CPC .... B60N 2/0248; B60N 2/002; B60N 2/0296; B60N 2/976; B60N 2/914; B60N 2/0244; B60N 2/665; B60N 2/56
See application file for complete search history.

(56) References Cited

U.S. PATENT DOCUMENTS

| | | | | |
|---|---|---|---|---|
| 5,637,076 | A | * | 6/1997 | Hazard ................ A61H 1/0292 601/5 |
| 5,964,455 | A | * | 10/1999 | Catanzarite ...... B60G 17/01933 248/550 |
| 6,007,151 | A | | 12/1999 | Benson |
| 6,203,105 | B1 | * | 3/2001 | Rhodes, Jr. .............. A47C 4/54 297/284.6 |
| 6,398,303 | B1 | | 6/2002 | Herrmann et al. |
| 7,152,920 | B2 | | 12/2006 | Sugiyama et al. |

(Continued)

OTHER PUBLICATIONS

U.S. Appl. No. 15/724,708, entitled "Adjustable Seat Assembly With Driving Modes", filed Oct. 4, 2017, 24 pages.

(Continued)

*Primary Examiner* — Mussa A Shaawat
(74) *Attorney, Agent, or Firm* — Brooks Kushman P.C.

(57) ABSTRACT

A seat assembly is provided with a seat bottom adapted to be mounted to a vehicle body. A seat back is adapted to be mounted adjacent to the seat bottom. At least one actuator is oriented in a region of one of the seat bottom and the seat back to adjust a seating position. A controller is in electrical communication with the actuator and is programmed to receive input indicative of a total travel time or distance, and adjust the seating position after a predetermined portion of the total travel time or distance to limit occupant discomfort.

20 Claims, 7 Drawing Sheets

(56) References Cited

U.S. PATENT DOCUMENTS

| | | | |
|---|---|---|---|
| 7,797,771 B1* | 9/2010 | Bossen | G16H 50/30 |
| | | | 5/4 |
| 7,967,381 B2 | 6/2011 | Sugiyama | |
| 8,126,616 B2 | 2/2012 | Phipps et al. | |
| 8,616,654 B2 | 12/2013 | Zenk et al. | |
| 8,958,955 B2 | 2/2015 | Hotary et al. | |
| 9,238,426 B2 | 1/2016 | Hopf et al. | |
| 9,845,026 B2 | 12/2017 | Pereny et al. | |
| 2006/0049678 A1* | 3/2006 | Kern | A47C 7/467 |
| | | | 297/284.3 |
| 2009/0099490 A1* | 4/2009 | Durt | A61H 9/0078 |
| | | | 601/115 |
| 2012/0053794 A1* | 3/2012 | Alcazar | B60N 2/0244 |
| | | | 701/48 |
| 2012/0086249 A1* | 4/2012 | Hotary | B60N 2/809 |
| | | | 297/284.3 |
| 2013/0009761 A1* | 1/2013 | Horseman | B60W 40/08 |
| | | | 340/425.5 |
| 2015/0008710 A1* | 1/2015 | Young | B60N 2/0276 |
| | | | 297/217.3 |
| 2015/0351692 A1 | 12/2015 | Pereny et al. | |
| 2015/0352979 A1 | 12/2015 | O'Bannon et al. | |
| 2015/0352990 A1 | 12/2015 | Zouzal et al. | |
| 2016/0339802 A1 | 11/2016 | Hanlon et al. | |
| 2018/0029503 A1* | 2/2018 | Dhaini | B60N 2/0244 |
| 2018/0134116 A1* | 5/2018 | Chen | B60H 1/00742 |

OTHER PUBLICATIONS

German Office Action for Application No. 10 2017 223 692.2, dated Jan. 15, 2020, 8 pages.

\* cited by examiner

| QUESTIONNAIRE | *REQUIRED |
|---|---|
| Gender | Male ▼ |
| Height* | 5' 10" ▼ |
| Weight* | 150 - 159lbs ▼ |
| Do you have any back pain?* | No ▼ |
| Have you experienced issues with your neck? | N/A ▼ |
| Have you experienced issues with your arms? | N/A ▼ |
| Have you experienced issues with your legs? | N/A ▼ |
| How often do you drive your primary vehicle? | Often, 4 to 6... ▼ |
| What is your activity level? | Somewhat ... ▼ |
| CANCEL | CONTINUE |

| 1 | Destination Known? | Yes | Compute travel time; Based on travel time, offer comfort plans; Go to 3 |
| 2 | | No | Get destination info from GPS; Go to 3 |
| 3 | Comport Plan Selected? | Yes | Start comfort plan; Go to 5 |
| 4 | | No | Occupant inputs custom comfort plan; Start comfort plan; Go to 5 |
| 5 | Travel Paused? | Yes | Go to 7 |
| 6 | | No | Continue comfort plan; Go to 11 |
| 7 | Occupant Left Seat? | Yes | Pause comfort plan; Go to 9 |
| 8 | | No | Continue comfort plan; Go to 9 |
| 9 | Travel Resumed? | Yes | Recalculate travel time; adjust comfort plan; initiate adjusted comfort plan; Go to 11 |
| 10 | | No | Go to 7 |
| 11 | Destination Reached? | Yes | Stop. |
| 12 | | No | Go to 5 |

| 1 | Destination Known? | Yes | Compute travel time; Based on travel time, offer comfort plans; Go to 3 |
|---|---|---|---|
| 2 | | No | Get destination info from GPS; Go to 3 |
| 3 | Comport Plan Selected? | Yes | Start comfort plan; Go to 5 |
| 4 | | No | Occupant inputs custom comfort plan; Start comfort plan; Go to 5 |
| 5 | Travel Paused? | Yes | Go to 7 |
| 6 | | No | Continue comfort plan; Go to 11 |
| 7 | Occupant Left Seat? | Yes | Pause comfort plan; Go to 9 |
| 8 | | No | Continue comfort plan; Go to 9 |
| 9 | Travel Resumed? | Yes | Recalculate travel time; adjust comfort plan; initiate adjusted comfort plan; Go to 11 |
| 10 | | No | Go to 11 |
| 11 | Travel Delayed? | Yes | Recalculate travel time; adjust comfort plan; initiate adjusted comfort plan; Go to 13 |
| 12 | | No | Continue comfort plan; Go to 13 |
| 13 | Destination Reached? | Yes | Stop. |
| 14 | | No | Go to 5 |

FIG. 13

ADJUSTABLE SEAT ASSEMBLY

CROSS-REFERENCE TO RELATED APPLICATIONS

This application claims the benefit of U.S. provisional application Ser. No. 62/440,076 filed Dec. 29, 2016, the disclosure of which is hereby incorporated in its entirety by reference herein.

TECHNICAL FIELD

Various embodiments relate to adjustable seat assemblies.

BACKGROUND

An adjustable seat assembly is disclosed in O'Bannon et al. U.S. Patent Application Publication No. US 2015/0352979 A1, which published on Dec. 10, 2015.

SUMMARY

According to at least one embodiment, a seat assembly is provided with a seat bottom adapted to be mounted to a vehicle body. A seat back is adapted to be mounted adjacent to the seat bottom. At least one actuator is oriented in a region of one of the seat bottom and the seat back to adjust a seating position. A controller is in electrical communication with the actuator and is programmed to receive input indicative of a total travel time, and adjust the seating position after a predetermined portion of the total travel time to limit occupant discomfort.

According to at least another embodiment, a seat assembly is provided with a seat bottom adapted to be mounted to a vehicle body. A seat back is adapted to be mounted adjacent to the seat bottom. At least one actuator is oriented in a region of one of the seat bottom and the seat back to adjust a seating position. A controller is in electrical communication with the actuator and is programmed to receive input indicative of a total travel distance, and adjust the seating position after a predetermined portion of the total travel distance to limit occupant discomfort.

According to at least another embodiment, a method for adjusting a seat assembly determines a total travel time, and operates an actuator to adjust a seating position after a predetermined portion of the total travel time to limit occupant discomfort.

According to at least another embodiment, a computer-program product embodied in a non-transitory computer readable medium is programmed to automatically adjust a seat assembly. The computer-program product comprising instructions for determining a total travel time, and operating an actuator to adjust a seating position after a predetermined portion of the total travel time to limit occupant discomfort.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A comfort, posture and wellness seating system for vehicle seat assemblies provides a visual interface with adjustment hardware organically or inorganically. The system may be employed to properly configure any new or existing seating system. The system can also address specific comfort, posture and wellness needs or preferences, such as thoracic support. The seating system objectifies comfort data and biomechanical knowledge to make the data transferable.

The comfort, posture and wellness seating system integrates anthropometry, biomechanics, and historical seating comfort data. The seating system can be employed in original equipment for vehicles or in aftermarket products. Applicable markets include automotive, mass transit, airlines, etc., as well as non-vehicular seating such as office, home, commercial, and public venue seating.

Data collection may be conducted that includes expert positioning of a suitable sample of occupants for optimal comfort or preferred posture by a medical professional. The data collection can be used at specific sites on an ongoing basis if required. The expert input provides a high level of expert comfort, posture and personalized fitting. The data may be based on anthropometry, body pressure distribution (BPD), status of actuators (such as pressure of inflatable air bladders, status of valves or the like), or other data that provides a comfort, posture and biomechanically optimized position of an adjustable vehicle seat assembly. The data is collected in a knowledge base or table for setting adjustments based on categories of data. The knowledge base may be compiled from the expert positioned data and the occupant specific data. The setting adjustments from the knowledge base are utilized for pre-set options in a vehicle seat assembly 28. The setting adjustments can be customized by a user at a controller or display.

Input data can be plotted versus adjustment settings for high level categorization. The settings can be categorized by topology clustering for setting the pre-set options. Various setting options may be provided for various types of driving. For example, a touring setting may provide per package settings and basic comfort, posture and wellness recommendations. The touring setting may also provide optimal visibility, use of features and controls, and the like. A performance setting may be provided for active drivers to provide a more erect position with firmer seating. Additionally, a luxury setting may be more reclined with softer seating.

Figure 1:
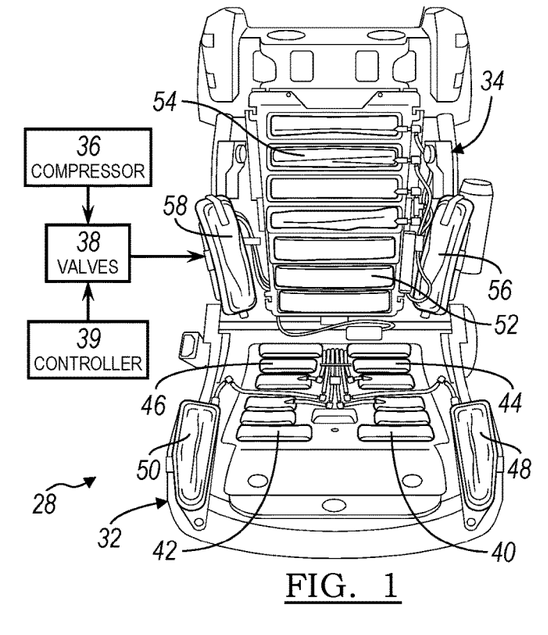
FIG. 1 is a front perspective view of a vehicle seat assembly, illustrated partially disassembled, according to an embodiment.

FIG. 1 illustrates a vehicle seat assembly 28 with a cover removed. The seat assembly 28 includes a seat cushion 32 adapted to be mounted for motor-driven adjustable translation in a fore and aft direction and in an up and down direction of a vehicle. The seat assembly 28 includes a seat back 34 pivotally connected to the seat cushion 32 to extend generally upright relative to the seat cushion 32 for motor-driven pivotal adjustment relative to the seat cushion 32. A head restraint (not shown) is mounted for motor-driven adjustable translation to the seat back 34.

At least one compressor 36 provides a source of air to the seat assembly 28. A plurality of valves 38 receive the compressed air and are controlled by a controller 39 for regulating compressed air into and out of the seat assembly 28. The seat cushion 32 includes a forward left air bladder 40, a forward right air bladder 42, a rear left air bladder 44, a rear right air bladder 46, a left side bolster air bladder 48, and a right-side bolster air bladder 50. The seat back 34 includes a plurality of lumbar air bladders 52, a plurality of thoracic air bladders 54, a left side bolster air bladder 56, and a right-side bolster air bladder 58. The valves 38 may be provided as a common valve bank that is housed in the seat back 34 or under the seat cushion 32; or the valves 38 may each be provided on each of the air bladders 40, 42, 44, 46, 48, 50, 52, 54, 56, 58. The compressor 36 may be provided in the seat back 34, the seat cushion 32 or concealed within the vehicle body. The controller 39 may be provided in a module under the seat cushion 32, and may be a multifunction controller that also controls other functions in the vehicle.

It is believed that supporting the thoracic region of the spine can reduce forces and support as much as one-third of the upper body mass. By increasing support of the upper body mass, loads are reduced on the muscles, ligaments, vertebrae and discs in the spine and pelvic regions. Decreased load reduces fatigue on these areas of the body. The thoracic air bladders 54 are adjustable to provide the right degree of support in the correct location necessary to reduce such loading.

The controller 39 receives adjustment settings from pre-set data or from customized data. The data may be input from an interface that is provided in the vehicle. The interface may be integrated into the vehicle, such as an instrument panel display that is in suitable wired or wireless communication with the controller 39. The interface may be remote, such as a personal digital assistant (PDA) including phones, tablets and the like. The interface may be provided as a smart phone application, wherein users enter relevant information about themselves. The smart phone interface may not require on-site expertise or seat properties. The remote interface permits a user to transport settings to each vehicle, such as personal passenger vehicles, airline seating, rental cars, and the like.

Figure 2:
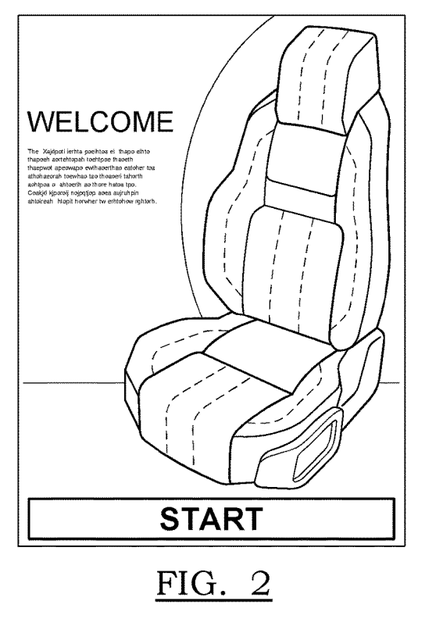
FIG. 2 is a display image for a vehicle seating system according to an embodiment.
Figure 3:
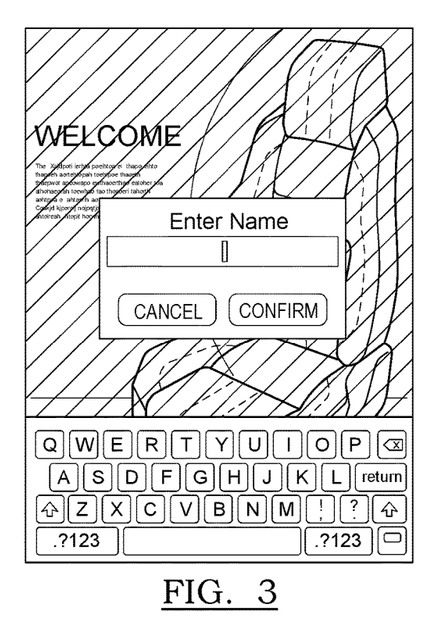
FIG. 3 is another display image for the vehicle seating system of FIG. 2.
Figure 4:
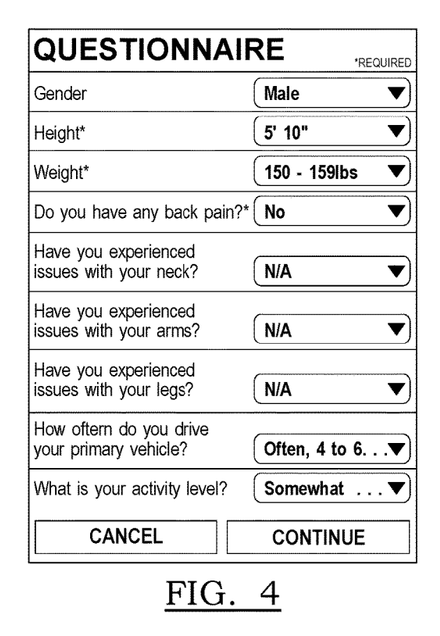
FIG. 4 is another display image for the vehicle seating system of FIG. 2.

FIGS. 2-7 illustrate display images from an interface, such as a tablet. FIG. 2 illustrates a welcome screen wherein a data collection process is initiated. FIG. 3 illustrates a screen wherein a user name is input to identify the user. FIG. 4 illustrates another input screen wherein biometric and personal health data, such as wellness and activity level, is collected. This data is utilized to adjust the seat to the pre-set options, based on prior-collected data in the knowledge base.

Figure 5:
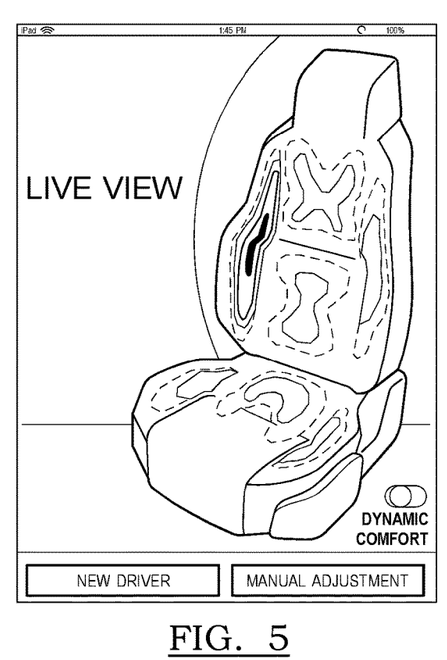
FIG. 5 is another display image for the vehicle seating system of FIG. 2.
Figure 6:
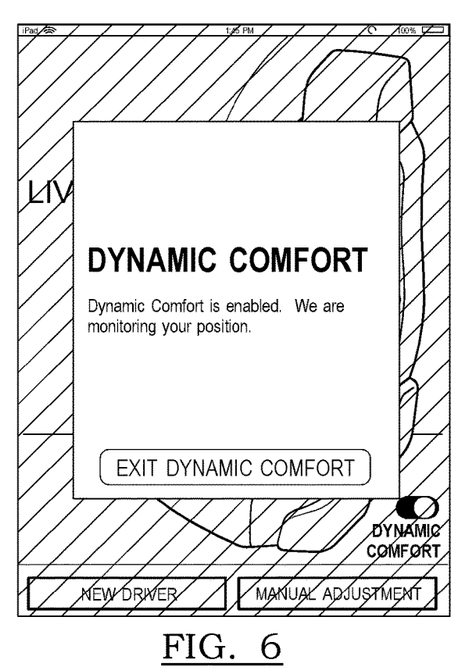
FIG. 6 is another display image for the vehicle seating system of FIG. 2.
Figure 7:
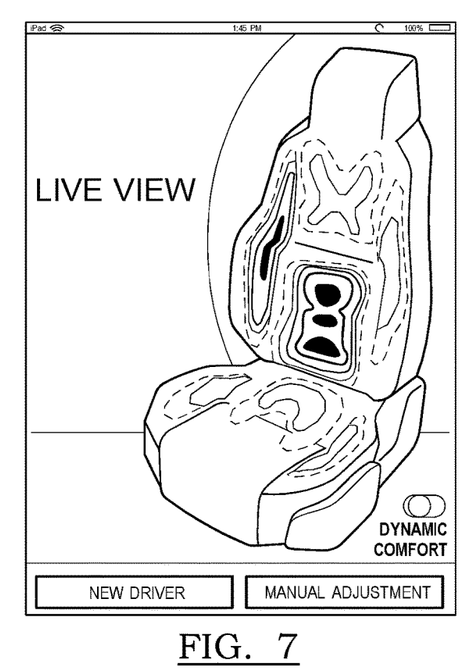
FIG. 7 is another display image for the vehicle seating system of FIG. 2.

Each of the air bladders 40, 42, 44, 46, 48, 50, 52, 54, 56, 58 may include a pressure sensor to detect air pressure in the respective bladder 40, 42, 44, 46, 48, 50, 52, 54, 56, 58. Any pressure sensor is contemplated, such as a pneumatic pressure sensor at the outlet valve of each respective air bladder 40, 42, 44, 46, 48, 50, 52, 54, 56, 58. Pressure can also be sensed by contact pressure sensors disposed in front of or behind some or all of the respective air bladders, including on a front or rear surface thereof. The contact pressure sensors may include pressure-sensing mats, such as those available by Tekscan®, Inc. of 307 West First Street. South Boston, Mass. 02127-1309, USA. FIG. 5 illustrates a depiction of the vehicle seat assembly 28 with zones ranging in color to depict a distribution of pressure upon the seat. This visualization may assist an occupant in positioning upon the seat assembly 28 with live visual feedback.

A dynamic comfort, posture and wellness option is offered. Selection of the dynamic comfort option measures the pressure in the sensors at FIG. 6, and displays a live view as in FIG. 7. The controller 39 compares the sensor values, and if the controller 39 determines that the occupant is not seated evenly, the controller 39 balances the air pressure in opposing air bladders to balance the occupant seating position.

Figure 8:
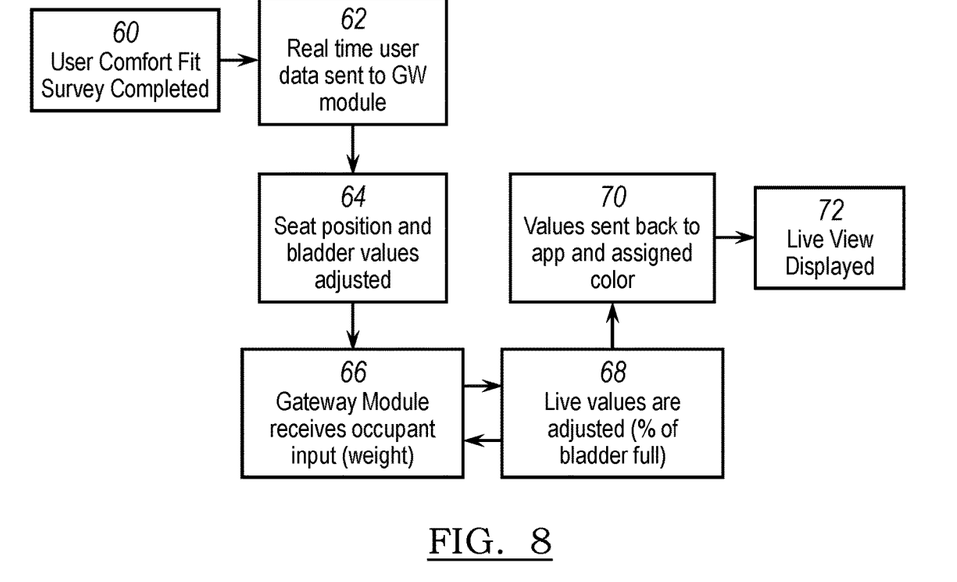
FIG. 8 is a flowchart of a portion of an overall method for adjusting a vehicle seat assembly according to an embodiment.

FIG. 8 depicts a flowchart for a method for adjusting the seat assembly 28 according to an embodiment. At block 60 the user comfort fit survey is completed. This process may be performed in an application on a PDA, tablet or smartphone, or in a controller in the vehicle. At block 62, real time user data is sent to a gateway module, or controller 39. In block 64, the seat assembly 28 is positioned, and the air bladder values are adjusted. At block 66, the gateway module receives an occupant weight distribution from the air bladder pressure sensors. At block 68 live values are adjusted, such as a percentage of bladder fullness. At block 70, the values are sent to the interface application, and the range of values is assigned a range of colors. In block 72, a live view is displayed, as in FIG. 7. Steps 66 and 68 are repeated for dynamically adjusting the seat assembly 28 to the occupant's position. Steps 66, 70 and 72 are repeated incrementally to provide the live view of the pressure distribution.

Figure 9:
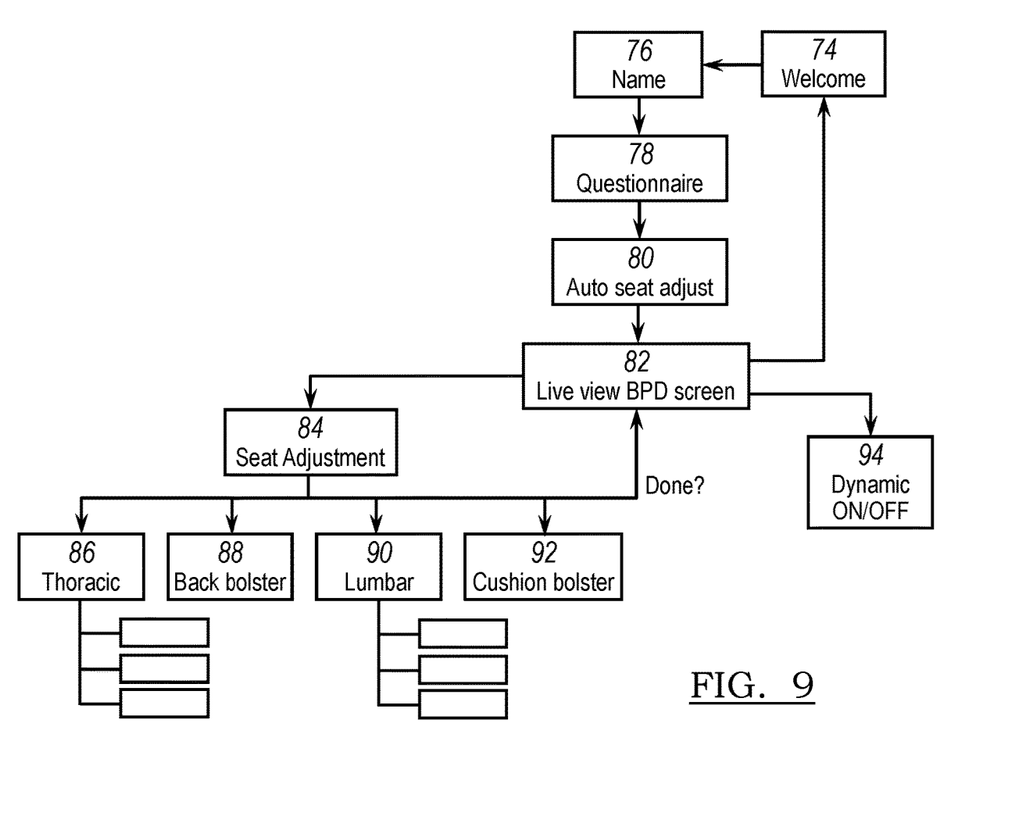
FIG. 9 is a flowchart of another portion of an overall method for adjusting a vehicle seat assembly according to another embodiment.

FIG. 9 depicts a flowchart for a method for adjusting the seat assembly 28 according to another embodiment. At block 74 a welcome screen initiates a data collection process. At block 76 a user name is input to identify the user. At block 78 another input screen includes a questionnaire wherein biometric and personal health data, such as wellness and activity level is collected. This data is utilized to adjust the seat at block 80 to the pre-set options, based on prior-collected data in the knowledge base. At block 82, a depiction of the vehicle seat assembly 28 is provided with zones ranging in color to depict a distribution of pressure upon the seat assembly 28. If manual adjustment is selected at block 84, the occupant can select a zone of the seat for adjustment, such as thoracic 86, back bolster 88, lumbar 90 and cushion bolster 92. Once manual adjustment is completed, the live view body pressure distribution (BPD) screen 82 is updated.

If a dynamic mode is selected at block 94, then the adjustments and live view are updated based on the measurements from the pressure sensors and the biometric data.

The seating assembly 28 also includes a "comfort plan" for the occupant. According to the comfort plan the seat assembly 28 is adjusted automatically to limit discomfort over long drives. A long drive may be determined as exceeding a predetermined period of time, exceeding a predetermined period of distance traveled, a combination of elapsed time and distance traveled, or the like. The controller 39 may be in communication with a global positioning system (GPS) for development of the comfort plan, which may be based upon travel time, travel distance and/or road type.

The controller 39 is programmed to initiate a comfort plan based on any number of inputs to optimize the occupant's comfort, blood flow, and the like. The comfort plan can be time dependent. The comfort plan may adjust in real time for changes throughout the drive, such as changes to travel time based upon traffic flow or the like. The controller 39 may reference occupant recognition, driving routes, driving habits or the like. The controller 39 may also factor in the time of the day and the activity for the comfort plan. For example, driving posture habits may alter during the course of a day, such as sitting more upright in the morning, and sitting more relaxed in the afternoon or evening. The controller 39 may modify the comfort plan for countermeasures if the occupant is still "uncomfortable" as measured by an amount of fidgeting, sweating or drowsiness. The controller 39 may employ a continuous feedback loop to maintain and/or improve comfort for the detected fidgeting, sweating, or drowsiness.

The inputs that are employed to initiate the comfort plan may include the occupant's destination, travel time, age, height, anthropometric data, and the like to optimize the occupant's comfort, blood flow or the like. Multiple comfort plans and occurrences are available in a single journey. The comfort plan may be based on an original travel schedule and then a revised travel schedule. The comfort plan may be lengthened or shortened depending on traffic and road conditions, and changes that affect the comfort plan. The comfort plan can be revised to repeat the plan, or each stage of the comfort plan can be extended or shortened to adjust for the revised travel schedule.

The comfort plan may also be modular. For example, the occupant or driver has the option of choosing a comfort plan from existing comfort plans. Alternatively, the comfort plan may be selected automatically by the controller 39. Additionally, the occupant can create a comfort plan from available features and options to create a customized comfort plan. Likewise, the controller 39 permits an occupant to opt out or discontinue any feature of a comfort plan.

The comfort plan may include occupant revitalization by posture correction of the occupant, applying a massage to the occupant, micro-vibration of the occupant, yoga stretches that are beneficial to the spine, and the like. The yoga spinal stretch may selectively inflate and deflate air bladders 52, 54, 56, 58 in the seat back 34 to adopt a spinal stretch. The controller 39 may communicate with an audio system to provide aural feedback with instructions to the occupant for active participation from the occupant to push back on the seat assembly 28.

According to one example, a yoga spinal stretch may include a greater than five-degree angular change in lumbar extension, locally along erector spinea, scalene, and the like. The yoga spinal stretch may be approximately ten degrees of angular change by inflation of the lumbar air bladders 52. The yoga spinal stretch is applied to zones in the seat back 34.

The yoga stretch may also be applied to the air bladders 40, 42, 48, 50 of the seat bottom 32 for pelvic tilt and for oblique and hip flexor stretch. A suitable pelvis bladder support system is disclosed in Patrick et al. U.S. Pat. No. 9,661,928 B2, which issued on May 30, 2017, and is incorporated in its entirety by reference herein. The posture correction, massage, micro-vibration, and stretches may be imparted by controlling the inflation and deflation of the air bladders 40, 42, 44, 46, 48, 50, 52, 54, 56, 58 or other actuators, such as motor driven adjusters of the seat cushion 32 and the seat back 34.

The comfort plan may also employ other seat mechanisms, such as heating and cooling to provide thermal therapy. The thermal therapy may apply a temperature change by heating, cooling, intermittently swapping heating and cooling, and the like. The thermal therapy may be a quick change, such as a change of greater than one degree Fahrenheit per minute. The thermal therapy affects nerve and muscle overload to trigger a reset of the muscle. The thermal therapy provides vasodilation when hot and vasoconstriction when cold to act like a pump for the blood, with a goal to remove toxins and provide a feeling of relaxation akin to Scandinavian and Nordic spas. According to one spa example, ten to fifteen minutes of heated thermal therapy, then a few seconds of cold exposure, and then a return to normal temperature results in relaxation, and then is repeated. According to an example of thermal therapy for injury therapy, two minutes of heated thermal therapy are applied, then one minute of cooled thermal therapy, then two minutes of hotter thermal therapy, then one minute of colder thermal therapy, then two minutes of even hotter thermal therapy, then one minute of even colder thermal therapy.

The controller 39 of the seat assembly 28 may also communicate with the vehicle to employ other interior features within the comfort plan. For example, the comfort plan may provide audio therapy by initiating a vehicle entertainment system to play stress-relieving music.

An example of a comfort plan according to an embodiment may be developed for a one-hundred-and-fifty-mile trip or a one hour trip. The comfort plan may be determined by a comfort theory, biomechanics, human factors and the like. An initial posture adjustment is selected for an initial period, such as fifty miles or twenty minutes. The initial posture is implemented by adjustment of the seat assembly 28. After the initial period, a massage is applied from the seat assembly 28. Next, the controller 39 adjusts the seat assembly 28 to a more aggressive posture adjustment or to a more lenient posture adjustment for the next twenty-five miles. For example, the more aggressive posture adjustment may be a one degree incline towards upright with a twenty percent inflation increase of the bolster air bladders 48, 50, 56, 58. Subsequently, a more corrective posture adjustment is employed for the next twenty-five miles. Then, a spinal stretch exercise is imparted upon the occupant. Finally, the seat assembly 28 is adjusted to return to the initial posture adjustment for the next fifty miles, followed by thermal and audio therapy.

Another example of a comfort plan according to another embodiment may be developed for a one-hundred-and-fifty-mile trip or a one hour trip. The comfort plan may be determined by a comfort theory, biomechanics, human factors and the like. An initial posture adjustment is selected for an initial period, such as fifty miles or twenty minutes. The initial posture is implemented by adjustment of the seat assembly 28. After the initial period, a massage is applied from the seat assembly 28. Next, the controller 39 adjusts the seat assembly 28 to a more aggressive posture adjustment for the next twenty-five miles. For example, the more aggressive posture adjustment may be a one degree incline towards upright with a twenty percent inflation increase of the bolster air bladders 48, 50, 56, 58. Subsequently, the controller 39 adjusts the seat assembly 28 to a more lenient posture adjustment for the next twenty-five miles. The more lenient posture may be one degree reclined from the initial position, and twenty percent deflation of the bolster air bladders 48, 50, 56, 58 from the initial inflation. Finally, the seat assembly 28 is adjusted to return to the initial posture adjustment for the next fifty miles or twenty minutes, followed by thermal and audio therapy.

Another example of a comfort plan according to an embodiment may be developed for a one hour trip. The comfort plan may be determined by a comfort theory, biomechanics, human factors and the like. An initial posture adjustment is selected for an initial period, such as twenty minutes. The initial posture is implemented by adjustment of the seat assembly 28. After the initial period, a massage is applied from the seat assembly 28. Next, the controller 39 adjusts the seat assembly 28 to a more aggressive posture adjustment or to a more lenient posture adjustment for the next ten minutes. Subsequently, a more corrective posture adjustment is employed for the next ten minutes. Then, a spinal stretch exercise is imparted upon the occupant. Finally, the seat assembly 28 is adjusted to return to the initial posture adjustment for the next twenty minutes, followed by thermal and audio therapy.

Figure 10:
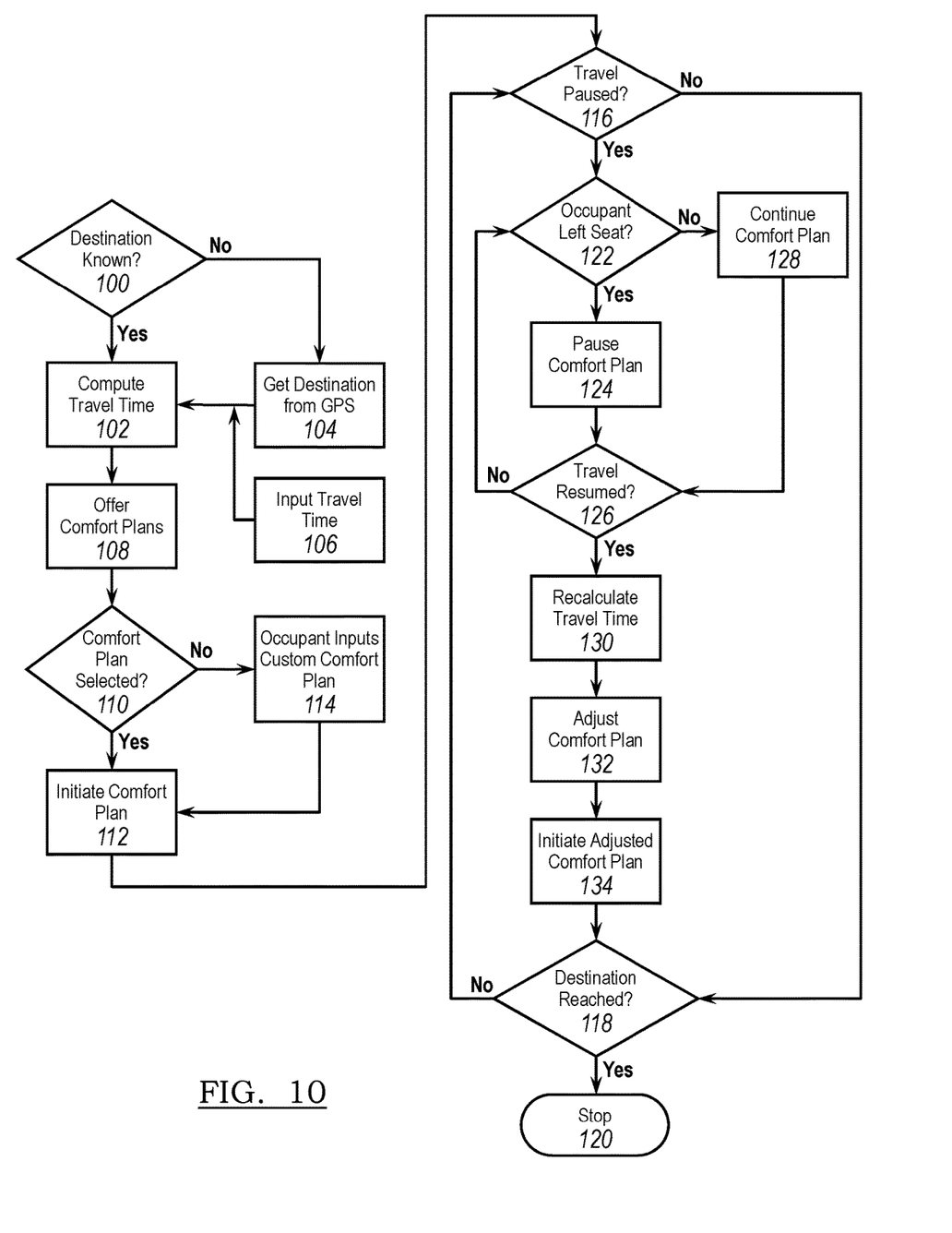
FIG. 10 is a flowchart of a portion of an overall method for adjusting a seat assembly according to another embodiment.

FIG. 10 depicts a flow chart for a comfort plan methodology as performed by the controller 39 of the seat assembly 28 according to an embodiment. At block 100, the controller 39 determines if the destination is known. If so, the controller 39 computes the travel time at block 102. If the destination is not known by the controller 39 at block 100, then the destination is obtained from a GPS at block 104. Then the destination is utilized to compute the travel time at block 102. If the destination has not been input to the GPS, at block 106, the travel time may be input for the computed travel time at block 102.

At block 108, a comfort plan is offered, which may include any of the comfort features described herein, or any combination of comfort features. At block 110, the controller 39 determines if a comfort plan has been selected. If a comfort plan has been selected, the controller 39 initiates the selected comfort plan at block 112. If a comfort plan was not selected at block 110, then the controller 39 permits the occupant to input a custom comfort plan at block 114, which is then initiated at block 112.

At block 116, the controller 39 determines whether travel has been paused. If travel has not been paused, the controller determines at block 118 whether the destination has been reached. If the destination has been reached, then the method is concluded at stop block 120. However, if the destination has not yet been reached at decision block 118, then decision block 116 is repeated to determine if the travel has been paused. If the controller 39 determines that the travel is paused at decision block 116, then the method proceeds to decision block 122.

The controller 39 determines at decision block 122 if the occupant has left the seat assembly 28. If the controller 39 determines that the occupant has left the seat assembly 28, then the comfort plan is paused at block 124. Then at decision block 126, the controller 39 determines if travel has resumed. If travel has resumed at block 126, then decision block 122 is repeated to determine if the occupant has left the seat assembly 28. If the controller 39 determines that the occupant has not left the seat assembly 28 at block 122, then the comfort plan is continued at block 128 to decision block 126.

Once the controller 39 determines that travel has resumed at decision block 126, then the controller 39 recalculates travel time at block 130. Then, the controller 39 adjusts the comfort plan at block 132 based upon the recalculated travel time from block 130. Next, the comfort plan is adjusted at block 134. The controller 39 determines if the destination is reached at block 118, and if so, the method is stopped at block 120.

Figure 11:
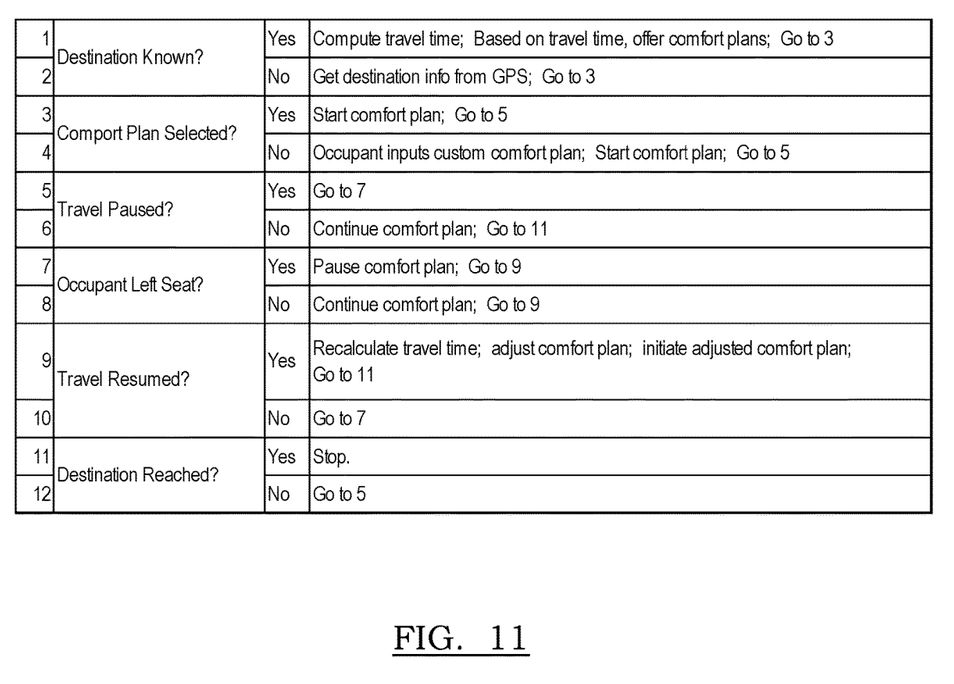
FIG. 11 is a chart of a portion of an overall method for adjusting a seat assembly according to another embodiment.

FIG. 11 depicts a chart for a comfort plan methodology as performed by the seat assembly 28 according to another embodiment. At step 1, the controller 39 determines if the destination is known. If so, the controller 39 computes the travel time at step 1. At step 1, a comfort plan is offered based upon the travel time. Then, the controller proceeds to step 3. If the destination is not known by the controller 39 at step 2, then the destination is obtained from the GPS. Then the controller proceeds to step 3.

At step 3, the controller 39 determines if a comfort plan has been selected. If a comfort plan has been selected, the controller 39 initiates the selected comfort plan at step 3 and proceeds to step 5. If a comfort plan was not selected at step 4, then the controller 39 permits the occupant to input a custom comfort plan, which is initiated, and then the controller proceeds to step 5.

At step 5, the controller 39 determines whether travel has been paused. If travel has been paused, then the controller 39 proceeds to step 7. At step 6, if travel has not been paused, then the controller 39 continues the comfort plan and proceeds to step 11.

The controller 39 determines at step 7 if the occupant has left the seat assembly 28. If the controller 39 determines that the occupant has left the seat assembly 28, then the comfort plan is paused; and the controller proceeds to step 9. If the controller 39 determines that the occupant has not left the seat assembly 28 at step 8, then the comfort plan is continued; and the controller proceeds to step 9.

At step 9, the controller 39 determines if travel has resumed. If travel has resumed, then the controller 39 recalculates travel time, adjusts the comfort plan based on the recalculated comfort plan, and initiates the adjusted comfort plan. After step 9, the controller 39 proceeds to step 11. However, if the controller 39 determines that travel has not resumed at step 10, then controller 39 repeats step 7 to determine if the occupant has left the seat assembly 28.

The controller 39 determines if the destination is reached at step 11, and if so, the method is stopped. However, if the controller 39 determines that the destination is not reached at step 12, then step 5 is repeated to determine if the travel has been paused.

The various comfort plan levels have decision points to determine the comfort plan level. One of these decision points is in response to why therapy may be requested. Therapy may be requested if the time or distance of the drive exceeds a predetermined limit. Therapy may be requested dependent upon a quality of the drive, such as the quality of the terrain traveled. Under these decision points, the controller 39 may employ therapy to stimulate blood flow and improve oxygenation in order to limit fatigue.

Another decision point for a comfort plan level may be when to initiate a therapy stage with comfort and human factors as theories for justifying the comfort plan level. According to one embodiment, therapy is initiated after eighteen to twenty minutes to prevent pooling of blood in the lower legs, such as in the calves. The pooling of blood in the lower legs begins after approximately ten minutes of rest. Changes in the backrest 34 angle, such as only one degree, can change loading on vertebrae of the occupant.

Another decision point for a comfort plan level may be justified by theories of comfort and human factors. For example, a change in body posture and massage stimulates the blood flow and improves oxygenation to the tissues allowing the occupant to feel energized and revitalized after a drive.

The revitalization and therapeutic features offered by the comprehensive comfort plans improve comfort, reduce fatigue, and hence, increase safety. The comfort plans also correct posture to promote health and wellness of the occupant. These comfort plans may be employed in any vehicle seat in any row.

The controller 39 may update the comfort plan or select an alternate comfort plan in response to an input indicative of an encountered traffic incident or traffic-associated delay. The traffic information may be entered manually. The traffic information may also be entered automatically from communication of the controller 39 with a GPS traffic aid.

Figure 12:
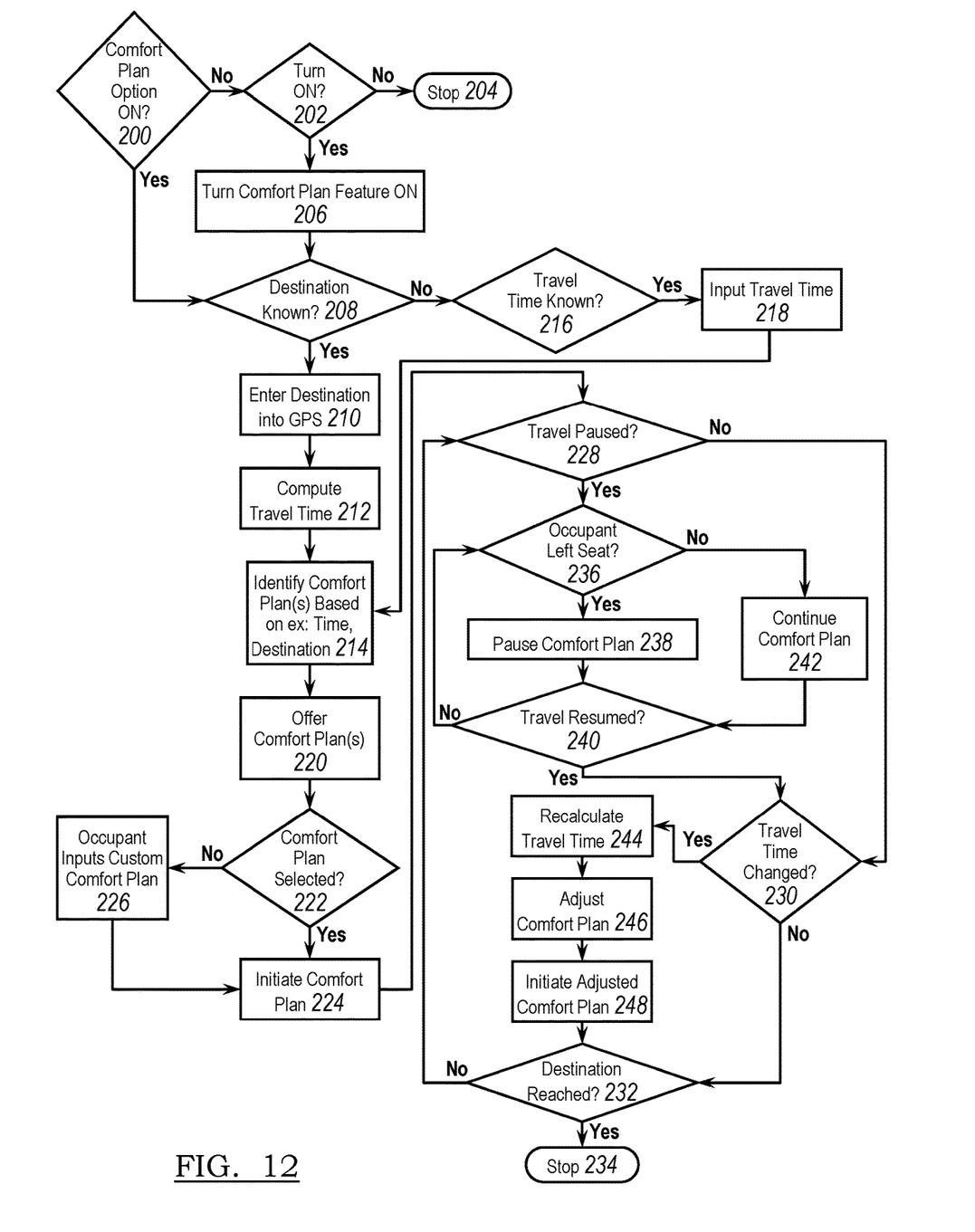
FIG. 12 is a flowchart of a portion of an overall method for adjusting a seat assembly according to another embodiment.

FIG. 12 depicts a flow chart for a comfort plan methodology as performed by the controller 39 of the seat assembly 28 according to another embodiment. At block 200, the controller 39 determines if a comfort plan option has been selected. If not, then at block 202, the controller 39 determines if the occupant would like to turn on the comfort plan, perhaps by an inquiry upon the display. If the occupant does not turn on the comfort plan, then the program ends at block 204. If the comfort plan option is selected at block 202, then the comfort plan is turned to on at block 206.

At block 208, the controller 39 determines if the destination is known. If so, the destination is entered into the GPS at block 210. The controller 39 computes the travel time at block 212. Then at block 214 the controller 39 identifies a comfort plan or plans based on factors such as time and destination. If the destination is not known by the controller 39 at block 208, then the travel time is requested at block 216. If the travel time is known, the travel time is input at block 218. Then the comfort plan is identified at block 214.

At block 220, a comfort plan is offered, which may include any of the comfort features described herein, or any combination of comfort features. At block 220, the controller 39 determines if a comfort plan has been selected. If a comfort plan has been selected, the controller 39 initiates the selected comfort plan at block 224. If a comfort plan was not selected at block 222, then the controller 39 permits the occupant to input a custom comfort plan at block 226, which is then initiated at block 224.

At block 228, the controller 39 determines whether travel has been paused. If travel has not been paused, the controller 39 determines at block 230 whether the travel time has changed. If the travel time has not changed, the controller 39 determines at block 132 whether the destination has been reached. If the destination has been reached, then the method is concluded at stop block 234. However, if the destination has not yet been reached at decision block 232, then decision block 228 is repeated to determine if the travel has been paused. If the controller 39 determines that the travel is paused at decision block 228, then the method proceeds to decision block 236.

The controller 39 determines at decision block 236 if the occupant has left the seat assembly 28. If the controller 39 determines that the occupant has left the seat assembly 28, then the comfort plan is paused at block 238. Then at decision block 240, the controller 39 determines if travel has resumed. If travel has not resumed at block 240, then decision block 236 is repeated to determine if the occupant has left the seat assembly 28. If the controller 39 determines that the occupant has not left the seat assembly 28 at block 236, then the comfort plan is continued at block 242 to decision block 240.

Once the controller 39 determines that travel has resumed at decision block 240, then the controller 39 determine if the travel time has changed at block 230. If the travel time has changed at block 230, then the controller 39 recalculates travel time at block 244. Then, the controller 39 adjusts the comfort plan at block 246 based upon the recalculated travel time from block 244. Next, the comfort plan is initiated at block 248. The controller 39 determines if the destination is reached at block 232, and if so, the method is stopped at block 234.

Figure 13:
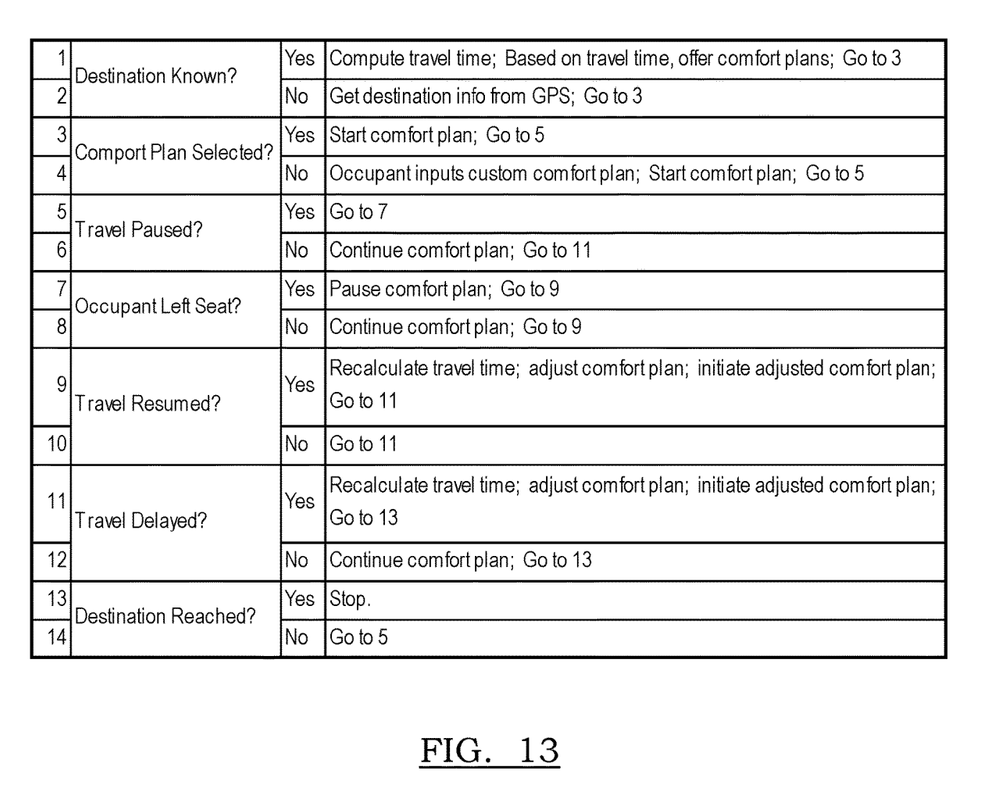
FIG. 13 is a chart of a portion of an overall method for adjusting a seat assembly according to another embodiment.

FIG. 13 depicts a chart for a comfort plan methodology as performed by the seat assembly 28 according to another embodiment. At step 1, the controller 39 determines if the destination is known. If so, the controller 39 computes the travel time at step 1. At step 1, a comfort plan is offered based upon the travel time. Then, the controller proceeds to step 3. If the destination is not known by the controller 39 at step 2, then the destination is obtained from the GPS. Then the controller proceeds to step 3.

At step 3, the controller 39 determines if a comfort plan has been selected. If a comfort plan has been selected, the controller 39 initiates the selected comfort plan at step 3 and proceeds to step 5. If a comfort plan was not selected at step 4, then the controller 39 permits the occupant to input a custom comfort plan, which is initiated, and then the controller proceeds to step 5.

At step 5, the controller 39 determines whether travel has been paused. If travel has been paused, then the controller 39 proceeds to step 7. At step 6, if travel has not been paused, then the controller 39 continues the comfort plan and proceeds to step 11.

The controller 39 determines at step 7 if the occupant has left the seat assembly 28. If the controller 39 determines that the occupant has left the seat assembly 28, then the comfort plan is paused; and the controller proceeds to step 9. If the controller 39 determines that the occupant has not left the seat assembly 28 at step 8, then the comfort plan is continued; and the controller proceeds to step 9.

At step 9, the controller 39 determines if travel has resumed. If travel has resumed, then the controller 39 recalculates travel time, adjusts the comfort plan based on the recalculated comfort plan, and initiates the adjusted comfort plan. After step 9, the controller 39 proceeds to step 11. However, if the controller 39 determines that travel has not resumed at step 10, then controller 39 repeats step 7 to determine if the occupant has left the seat assembly 28.

The controller 39 determines if travel has been delayed at step 11. If so, the controller 39 recalculates travel time, adjusts the comfort plan and initiates the comfort plan. Then the controller proceeds to step 13. If the controller 39 determines that travel was not delayed at step 12, then the comfort plan is continued, and the controller 39 proceeds to step 13.

The controller 39 determines if the destination is reached at step 13, and if so, the method is stopped. However, if the controller 39 determines that the destination is not reached at step 14, then step 5 is repeated to determine if the travel has been paused.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat bottom adapted to be mounted to a vehicle body;
   a seat back adapted to be mounted adjacent to the seat bottom;
   at least one actuator oriented in a region of one of the seat bottom and the seat back to adjust a seating position; and
   a controller in electrical communication with the at least one actuator and programmed to:
   receive input indicative of a total travel time,
   operate the at least one actuator to adjust the seating position after a predetermined portion of the total travel time to limit occupant discomfort,
   determine a sequence of actuator adjustments based on the total travel time,
   receive input indicative of a modified total travel time, and
   modify the sequence of actuator adjustments based on the modified total travel time.

2. The seat assembly of claim 1 wherein the controller receives an input indicative of a mode selection before operating the at least one actuator.

3. The seat assembly of claim 1 wherein the controller is further programmed to operate the at least one actuator to adjust the seating position after a second predetermined portion of the total travel time.

4. The seat assembly of claim 1 wherein the controller is in electrical communication with a vehicle global positioning system (GPS), and is further programmed to receive input indicative of the total travel time from the GPS based upon a target destination.

5. The seat assembly of claim 1 wherein the controller is in electrical communication with a vehicle controller and is further programmed to:
   determine if vehicle travel has been paused; and
   recalculate the total travel time in response to receipt of input from the vehicle controller indicative that vehicle travel has resumed.

6. The seat assembly of claim 1 further comprising at least one sensor in electrical communication with the controller and oriented upon the seat assembly to detect a presence of an occupant; and
   wherein the controller is further programmed to:
   receive input from the at least one sensor indicative of egress of an occupant from the seat assembly,
   receive input from the at least one sensor indicative of presence of an occupant upon the seat assembly after egress,
   recalculate the total travel time in response to receipt of the input of the presence of the occupant.

7. The seat assembly of claim 1 wherein the at least one actuator further comprises:
   a pair of side bolster air bladders oriented in side bolster regions of the seat back; and
   a recline actuator to adjust a recline angle of the seat back relative to the seat bottom.

8. The seat assembly of claim 7 wherein the controller is further programmed to:
   determine four sequential periods of time as portions of the total travel time;
   maintain the seat assembly in an initial position for the first sequential period;
   adjust the recline actuator to increase an incline of the seat back during the second sequential period; and
   increase inflation of the pair of side bolster air bladders during the second sequential period.

9. The seat assembly of claim 8 wherein the controller is further programmed to:
   adjust the recline actuator to recline the seat back relative to the initial position during the third sequential period; and
   decrease inflation of the pair of side bolster air bladders relative to the initial position during the third sequential period.

10. The seat assembly of claim 9 wherein the controller is further programmed to return the seat assembly to the initial position for the fourth sequential period.

11. The seat assembly of claim 1 wherein the at least one actuator further comprises a lumbar air bladder oriented in a lumbar region of the seat back; and
    wherein the controller is further programmed to increase inflation to the lumbar air bladder after the predetermined portion of the total travel time to stretch the back of the occupant.

12. The seat assembly of claim 1 wherein the controller is further programmed to operate the at least one actuator to cause a five-degree angular change in a lumbar extension in response to receipt of input indicative of selection of a spinal stretch mode.

13. The seat assembly of claim 1 wherein the controller is further programmed to operate a hear transfer actuator in response to receipt of input indicative of selection of a heat therapy mode.

14. A seat assembly comprising:
    a seat bottom adapted to be mounted to a vehicle body;
    a seat back adapted to be mounted adjacent to the seat bottom;
    at least one actuator oriented in a region of one of the seat bottom and the seat back to adjust a seating position; and
    a controller in electrical communication with the at least one actuator programmed to:
    receive input indicative of a total travel distance, and
    operate the at least one actuator to adjust the seating position after a predetermined portion of the total travel distance to limit occupant discomfort.

15. The seat assembly of claim 14 wherein the controller is further programmed to operate the at least one actuator to adjust the seating position after a second predetermined portion of the total travel distance.

16. The seat assembly of claim 14 wherein the controller is in electrical communication with a vehicle global positioning system (GPS), and is further programmed to receive input indicative of the total travel distance from the GPS based upon a target destination.

17. The seat assembly of claim 14 wherein the controller is further programmed to determine a sequence of actuator adjustments based on the total travel distance.

18. The seat assembly of claim 17 wherein the controller is further programmed to:
    receive input indicative of a modification to the total travel distance; and
    modify the sequence of actuator adjustments based on the modified total travel distance.

19. A seat assembly comprising:
a seat bottom adapted to be mounted to a vehicle body;
a seat back adapted to be mounted adjacent to the seat bottom;
at least one actuator oriented in a region of one of the seat bottom and the seat back to adjust a seating position; and
a controller in electrical communication with the at least one actuator and programmed to:
  receive input indicative of a total travel time, and
  operate the at least one actuator to adjust the seating position after a predetermined portion of the total travel time to limit occupant discomfort;
wherein the at least one actuator further comprises:
  a pair of side bolster air bladders oriented in side bolster regions of the seat back, and
  a recline actuator to adjust a recline angle of the seat back relative to the seat bottom;
wherein the controller is further programmed to:
  determine four sequential periods of time as portions of the total travel time,
  maintain the seat assembly in an initial position for the first sequential period,
  adjust the recline actuator to increase an incline of the seat back during the second sequential period,
  increase inflation of the pair of side bolster air bladders during the second sequential period,
  adjust the recline actuator to recline the seat back relative to the initial position during the third sequential period, and
  decrease inflation of the pair of side bolster air bladders relative to the initial position during the third sequential period.

20. The seat assembly of claim 19 wherein the controller is further programmed to return the seat assembly to the initial position for the fourth sequential period.

* * * * *

UNITED STATES PATENT AND TRADEMARK OFFICE
CERTIFICATE OF CORRECTION

PATENT NO. : 10,640,010 B2
APPLICATION NO. : 15/724025
DATED : May 5, 2020
INVENTOR(S) : Arjun Yetukuri et al.

It is certified that error appears in the above-identified patent and that said Letters Patent is hereby corrected as shown below:

In the Claims

Column 12, Line 34, Claim 13:
After "programmed to operate a"
Delete "hear" and
Insert -- heat --.

Signed and Sealed this
Fifteenth Day of September, 2020

Andrei Iancu
*Director of the United States Patent and Trademark Office*